United States Patent
Zivanovic et al.

(10) Patent No.: US 7,347,227 B2
(45) Date of Patent: Mar. 25, 2008

(54) METHOD OF REINFORCING A CYLINDRICAL PIPELINE AND PREFABRICATED PLATE USED IN SUCH METHOD

(75) Inventors: Ivica Zivanovic, Arnouville-les-Gonesse (FR); Benoît Lecinq, Fontenay-Aux-Roses (FR); Dominique Deschamps, Boulogne-Billancourt (FR); Ronan Solet, Sevres (FR)

(73) Assignee: Freyssinet International (STUP) (FR)

( * ) Notice: Subject to any disclaimer, the term of this patent is extended or adjusted under 35 U.S.C. 154(b) by 775 days.

(21) Appl. No.: 10/804,711

(22) Filed: Mar. 19, 2004

(65) Prior Publication Data

US 2004/0255545 A1  Dec. 23, 2004

(30) Foreign Application Priority Data

Mar. 20, 2003 (FR) .................................. 03 03417

(51) Int. Cl.
*F16L 9/00* (2006.01)

(52) U.S. Cl. ..................... 138/172; 138/174; 138/175; 138/99

(58) Field of Classification Search ................ 138/172, 138/174, 175, 99; 285/197
See application file for complete search history.

(56) References Cited

U.S. PATENT DOCUMENTS

| 3,275,040 A | 9/1966 | Szulc et al. .................. 138/176 |
| 3,315,989 A | 4/1967 | Ohnstad ...................... 285/197 |
| 3,338,601 A * | 8/1967 | Osweiler ..................... 285/197 |
| 3,355,529 A | 11/1967 | Easterday ..................... 264/32 |
| 4,504,086 A | 3/1985 | Carrow ..................... 285/133.5 |
| 7,174,920 B2 * | 2/2007 | Stubler et al. ................. 138/99 |

FOREIGN PATENT DOCUMENTS

WO   WO 03/014614 A1   2/2003

* cited by examiner

*Primary Examiner*—Patrick F. Brinson
(74) *Attorney, Agent, or Firm*—Banner & Witcoff, Ltd.

(57) ABSTRACT

In order to reinforce a cylindrical pipeline, in particular an underground water supply pipeline, prestressing reinforcements are placed and tensioned around it. In a zone where the pipeline has a radial projection, for example providing a manhole for access to the inside of the pipeline, the prestressing reinforcements are deflected to bypass the radial projection so that the reinforcements, located in the same layer on a side of the pipeline opposite the side having the projection, are distributed in a plurality of layers on this side having the protuberance.

25 Claims, 6 Drawing Sheets

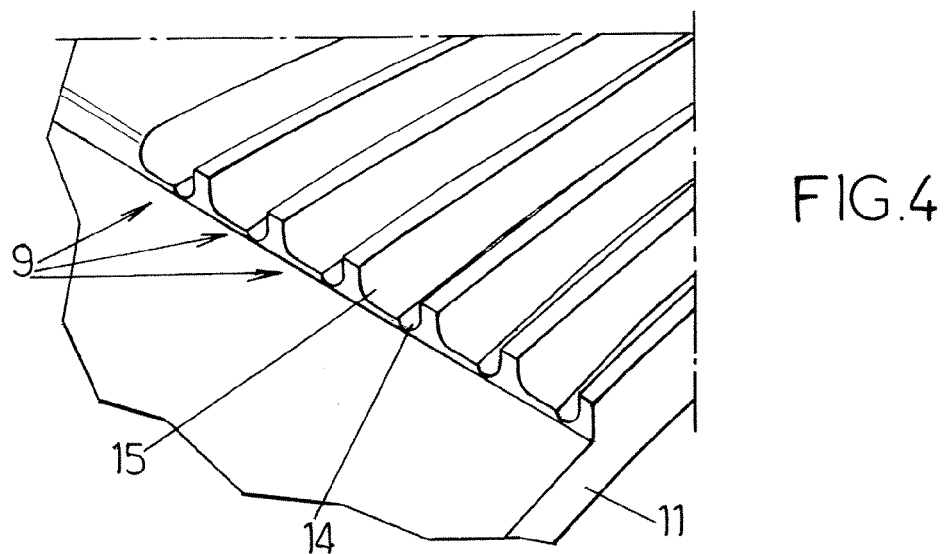
FIG.4
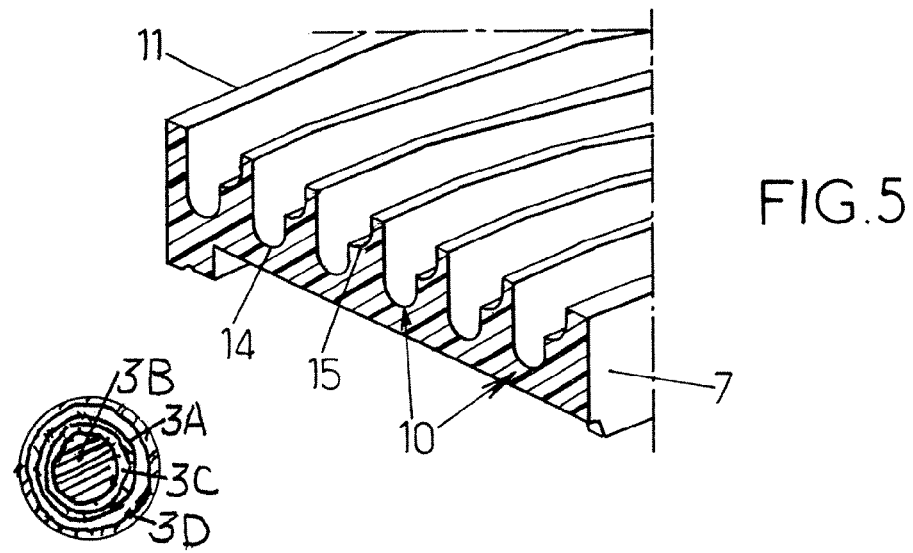
FIG.5
FIG.9
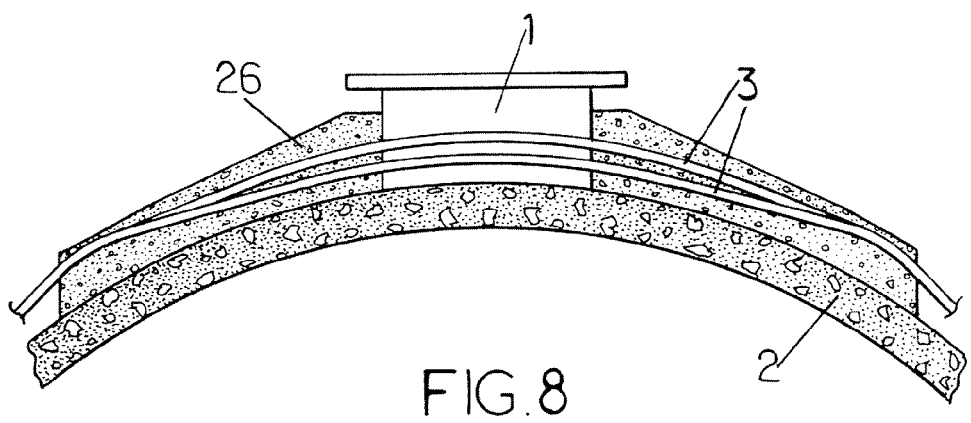
FIG.8

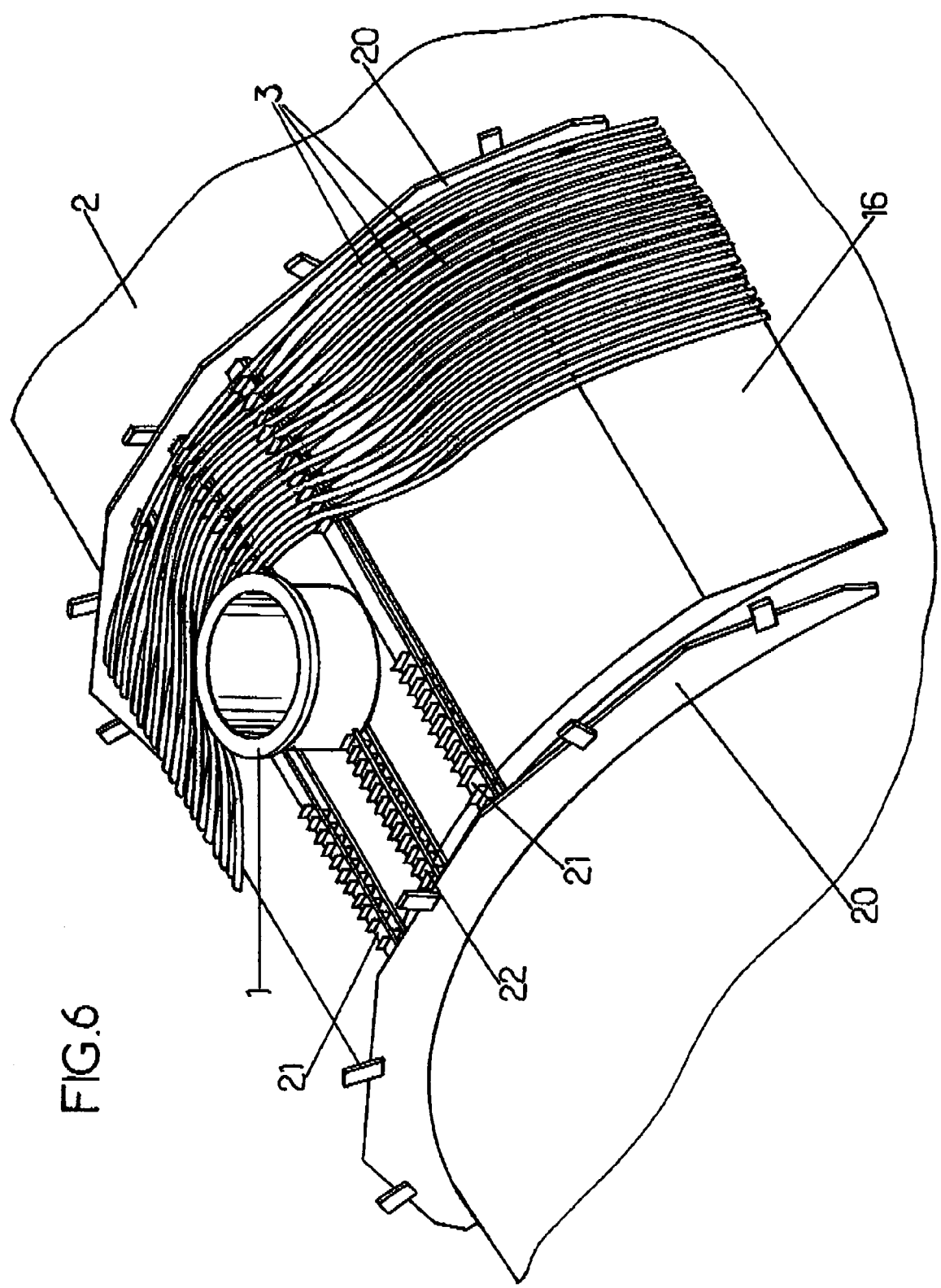

METHOD OF REINFORCING A CYLINDRICAL PIPELINE AND PREFABRICATED PLATE USED IN SUCH METHOD

CROSS REFERENCE TO RELATED APPLICATIONS

This application claims priority to France Patent Application Ser. No. FR 03 03417, filed Mar. 20, 2003, which is incorporated herein by reference in its entirety.

BACKGROUND OF THE INVENTION

The present invention relates to the techniques for reinforcing pipelines and, in particular, to the repair of underground pipelines.

These pipelines are, for example, part of a water supply network. In their commonest form, these pipelines consist of an end-to-end assembly of prestressed concrete pipe segments with a diameter ranging from about 0.5 to 6 meters. Water circulates in them at a pressure which may be about twenty bars. These concrete pipe segments may comprise an inner metal liner. However, the latter is not designed to withstand the pressure forces due to the circulating fluid. These forces are absorbed by the prestressing applied to the concrete by means of wires wound spirally on the outside of the concrete core of the pipe segment. During the prefabrication of such segment, its concrete core is set in rotation about its axis in order to receive the wire which is braked for the purpose of tensioning. This wire is subsequently protected against corrosion by spraying an additional layer or concrete or mortar over a few tens of millimeters.

In spite of this protecting layer and of the passivation of the steel forming these prestressing wires, it may happens that the prestressing wires experience corrosion which generally leads to a deterioration in the protective coating and therefore to an acceleration of the phenomenon which may cause a break of the wires and therefore a structural embrittlement of the pipeline or even the fracture of the latter under the effect of the pressure of the circulating fluid.

After the damage to one or more segments has been detected by preventive methods (in particular, by acoustic detection), the traditional methods involve first excavating the material (sand, earth or the like) surrounding the damaged segments, then either simply replacing the segments in question, which necessitates draining the supply network beforehand, thus resulting in a considerable detriment to the operation of the network, or manually repairing the outer surface of the pipeline, if the latter has not yet given way.

International Patent Application No. WO 03/014614, the content of which is incorporated herein by reference, discloses a method for repairing a pipeline for the supply of a fluid under pressure, composed of a succession of underground prestressed concrete pipe segments, comprising the steps of:

making a trench in order to free a length of the pipeline;
carrying out a first excavation in the trench under a first pipeline portion substantially centered on a junction between two adjacent segments;
installing and tensioning at least one prestressing reinforcement around the first portion of the pipeline;
filling in the first excavation with soil material and compacting this material;
carrying out a second excavation in the trench under a second pipeline portion adjacent to the first portion and included in a single segment;
installing and tensioning at least one prestressing reinforcement around the second portion of the pipeline; and
filling in the second excavation with soil material and compacting this material.

This method has the advantage of making it possible to restore a damaged zone of the pipeline, whilst at the same time adhering to the technical constraints associated with this type of structure and its operation.

On this type of large pipeline, there are generally manholes uniformly spaced apart over its length, enabling an operator to have access to equipment such as valves, pressure control devices, vents or the like, or to enter inside the pipeline to carry out inspection or repair work in there. Such a manhole gives rise to a radial projection on top of the pipeline. Where it enables access to the interior of the pipeline, the projection contains a lock chamber having an upper hatch for access from outside and a lower hatch equipped with safety valves.

The manhole zones are preferential corrosion points, since the original prestress provided by wires has to be interrupted there and anchored by means of studs between large steel plates. In addition, it is not rare that water is present at the base of the manhole.

FIG. 1 shows such a manhole projection 1 on top of a pipeline 2, around which prestressing reinforcements 3 have been installed, for example according to the method described in the above-mentioned International Patent Application No. WO 03/014614. It can be seen that the additional prestressing reinforcements cannot surround the pipeline in the manhole zone 4.

An object of the present invention is to make it possible to complete the installation of prestressing reinforcements around a pipeline, including in the zones having projections, such as those required for manholes.

SUMMARY OF THE INVENTION

The invention thus proposes a method of reinforcing a cylindrical pipeline wherein prestressing reinforcements are placed and tensioned around the pipeline. In a zone where the pipeline has a radial projection on a first side, the prestressing reinforcements are deflected to bypass the radial projection. Reinforcements located in a common layer on a second side of the pipeline opposite the first side are distributed in a plurality of layers on the first side.

A relatively high density of reinforcements can thus be arranged in the zone of the projection. This is relevant since it is often a zone of potential weakness. The paths of the reinforcements distributed in a plurality of layers ensure their deflection, whilst avoiding the problems of accumulation of the reinforcements one on the other, thus allowing them to operate under good conditions.

In a particular embodiment of the method, the deflection of the reinforcements around the radial projection is carried out by means of at least one prefabricated plate having an orifice providing a passage for the radial projection and channels for guiding the reinforcements.

This embodiment may have any one of the following features:

the channels for guiding the reinforcements are in the form of grooves open onto an upper face of the prefabricated plate;
these grooves are designed for receiving reinforcements individually along two edges of the prefabricated plate which are located on either side of a mid-plane containing the longitudinal direction of the pipeline and the direction of the radial projection, the grooves merging at least in pairs in a cross-section along said mid-plane, so as to offer the multiple reinforcements received in a merged groove a plurality of bearing surfaces located in different layers perpendicularly to the plate;

the reinforcements are guided at the entrance to the prefabricated plate so as to prevent reinforcements from having angular points at the edge of the plate;

the prefabricated plate is laid onto the pipeline with a gap filled by a positioning mortar;

the prefabricated plate is made from cast iron or from poured concrete.

Another aspect of the present invention relates to a prefabricated plate having channels for the guidance of prestressing reinforcements for carrying out such an embodiment of the method.

In another embodiment of the method, before the prestressing reinforcements are tensioned, a formwork is placed in said zone of the pipeline on the first side, within which formwork spacing means are positioned in order to define the paths in the form of a plurality of layers of reinforcements, concrete is poured into the formwork, and the reinforcements are tensioned after the setting of the poured concrete. Individual tubes, each receiving a prestressing reinforcement, may be arranged in the formwork.

The invention is also applicable in cases where the manhole projection is not yet present on the pipeline. The method is then applied either when repairing the pipeline or when constructing it.

In such a case, the method according to the present invention also involves installing and tensioning prestressing members around the pipeline, and it comprises the steps of:

selecting a section of the pipeline to receive a radial projection on a first side of the pipeline; and deflecting the prestressing members to guide said members off a position of the radial projection so that the prestressing members located in a common layer on a second side of the pipe opposed to the first side are distributed into a plurality of layers on the first side.

The radial projection can be erected afterwards, for instance to accommodate a manhole or equipment useful to operation of the pipeline network.

BRIEF DESCRIPTION OF THE DRAWING

In the detailed description which follows reference will be made to the drawing comprised of the following Figures:

FIG. 4 is a perspective view of a portion of the prefabricated plate of FIG. 3, revealing the shape of channels for guiding the reinforcements in this portion;

FIG. 5 is a perspective view of another portion of this plate, with a section along the plane P1 indicated in FIG. 3, to reveal the shape of the guide channels in this other portion;

FIG. 6 is a perspective view showing the installation of a formwork in the manhole zone in another embodiment of the method;

FIG. 8 is a cross-sectional diagram of the upper part of the pipeline, showing the paths of the reinforcements in the vicinity of the manhole.

FIG. 9 is a cross-sectional view of a sheathed reinforcing strand.

DESCRIPTION OF THE PREFERRED EMBODIMENTS

The underground pipeline 2 is formed by a succession of pipe segments assembled end-to-end. Each of the pipe segments consists, for example, of a concrete core having a diameter ranging from about 0.5 m to about 6 m, possibly comprising a metal inner liner and having a mean unit length L of, e.g., about 7.5 m.

These segments are for conveying water under a pressure of the order of approximately 20 bar and are mostly or completely buried in earth or in sand. In this way, the surrounding soil exerts a counterpressure on the outer walls of the segments.

In order to improve the resistance of these segments to the pressure of the fluid, prestressing wires are wound spirally in one or two layers on their outer face and are tensioned during their winding. An additional layer of air laid mortar or concrete covers these prestressing wires in order to protect them against the corrosive agents possibly present in the soil.

Each of the joints between the segments is formed by the fitting of a straight end of one of the adjacent segments into a widening provided at the end of the next segment, a sealing mortar being applied along the circumference of the joint. The pipeline 2 thus forms a highly rigid assembly which does not allow any bending or shearing forces in the region of the joints.

The corrosion of the prestressing wires as a result of the penetration of aggressive agents into the protective mortar layer may lead to the break of one or more metal wires. These breaks are generally grouped at points of preferential penetration of the aggressive agents and lead to a delamination or crumbling of the protective mortar layer under a shearing effect. These delaminations are faults which require repair. They tend to occur frequently in the vicinity of the manholes provided along the pipeline.

Figure 1:
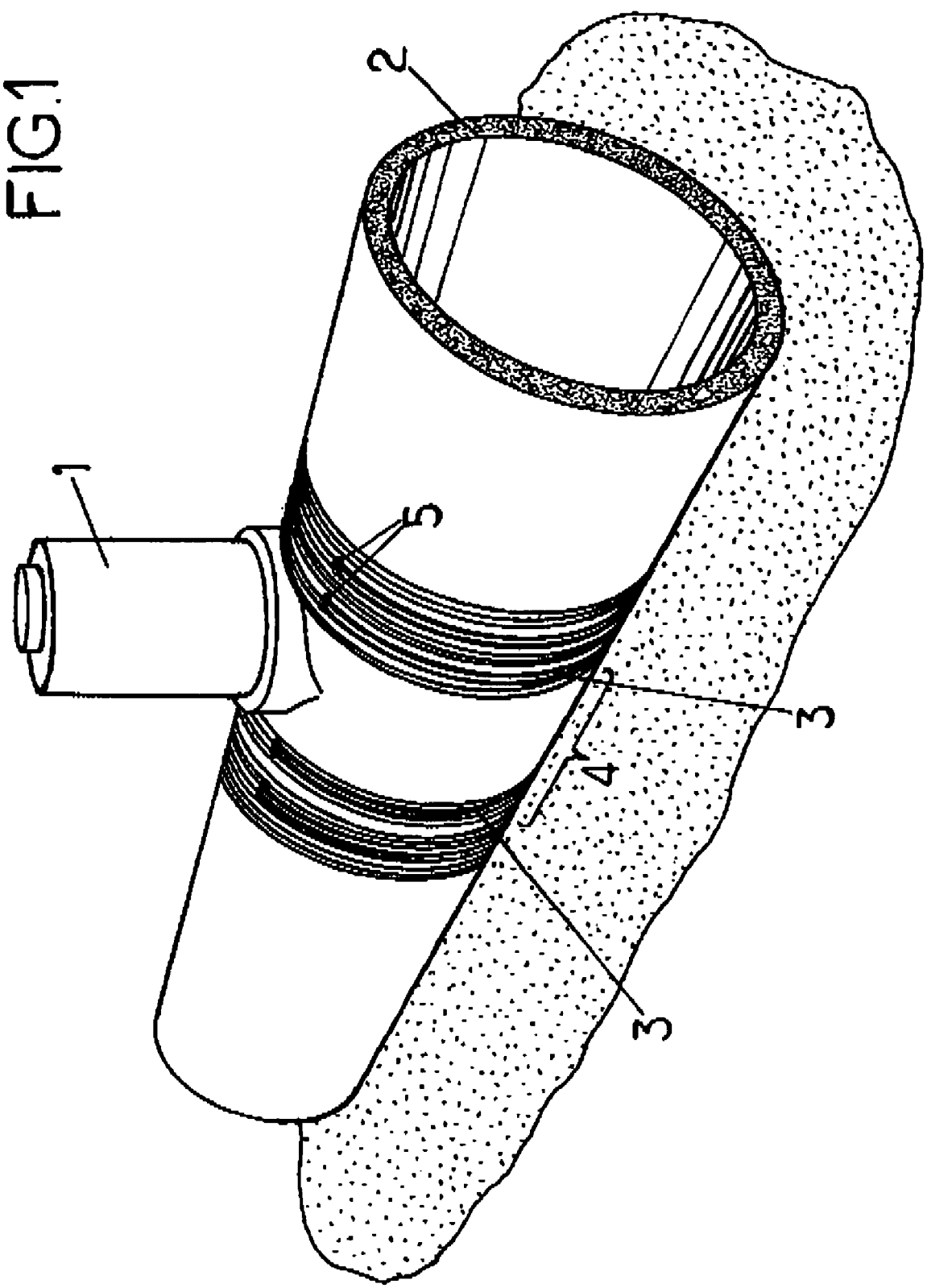
FIG. 1, previously commented on, is a perspective view of an underground pipeline exposed by means of a trench dug in a zone provided with a manhole projection.
Figure 2:
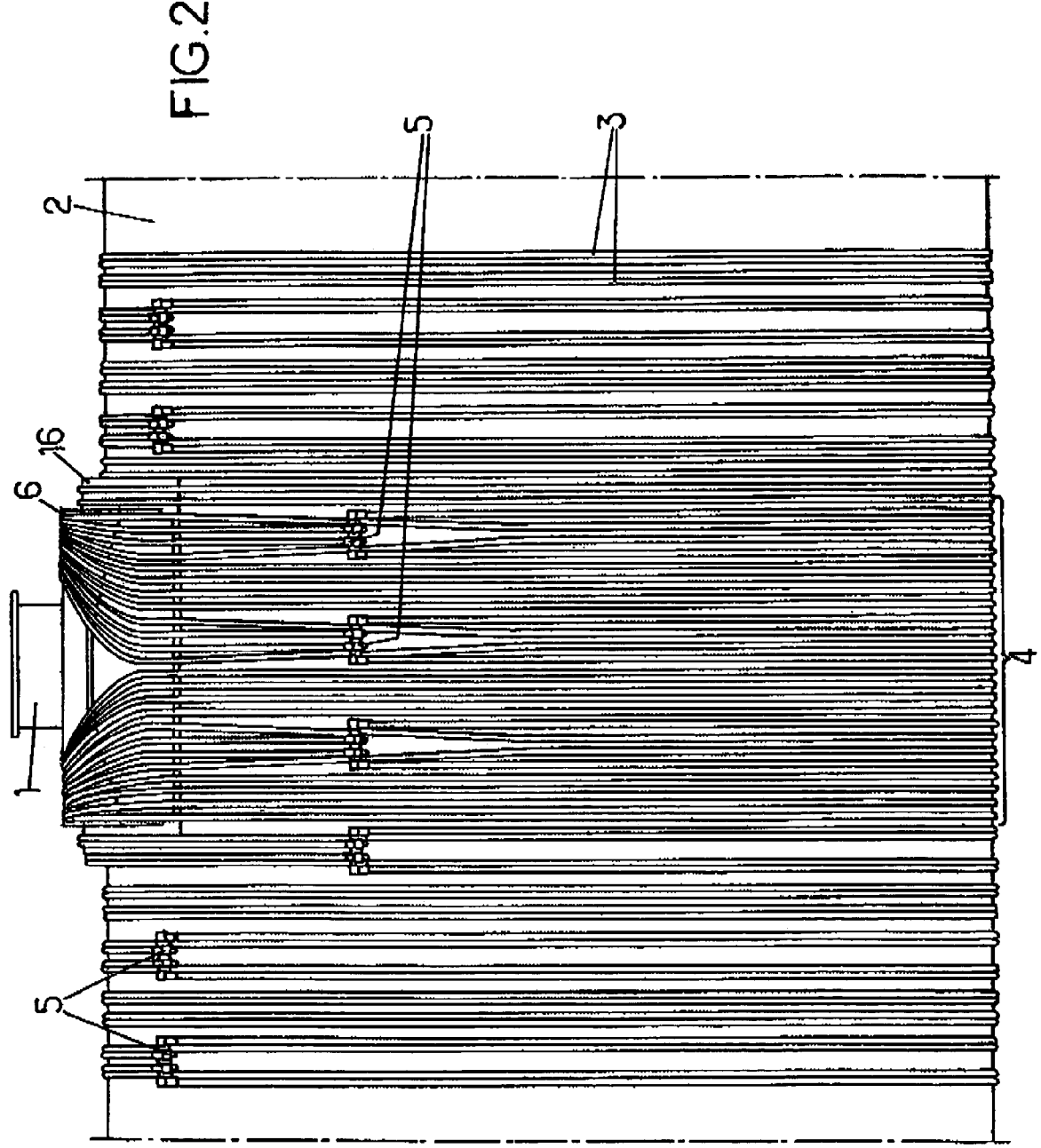
FIG. 2 is an elevation view of the repaired pipeline in the vicinity of the manhole.

In order to repair the pipeline, an additional prestress is installed on the outside of the pipeline with the aid of reinforcements 3 arranged around the pipeline 2 and distributed along the repaired zone (FIGS. 1 and 2). These reinforcements are advantageously prestressing strands, preferably individually sheathed strands, which thus improves their corrosion resistance. Advantageously, the strands each surround the pipeline over two revolutions and are anchored with the aid of devices 5 of the type described in International Patent Application No. WO 02/075069, the content of which is incorporated herein by reference.

The strands 3 are expediently provided with a double plastic sheath in view of the corrosive nature that the sand in which the pipeline is buried may have. A first sheath 3A is coextruded onto the metal strand 3B, with a grease or a wax 3C in contact with the metal. The second sheath 3D is a plastic tube 3D into which the strand 3B covered with its first sheath 3A is threaded. Each tube 3D may be injected with cement grout after anchoring(See FIG. 9).

As shown in FIG. 1, the circular paths of the strands 3 perpendicularly to the axis of the pipeline 2 cannot be adopted in line with the radial projection 1 due to the presence of a manhole.

Figure 3:
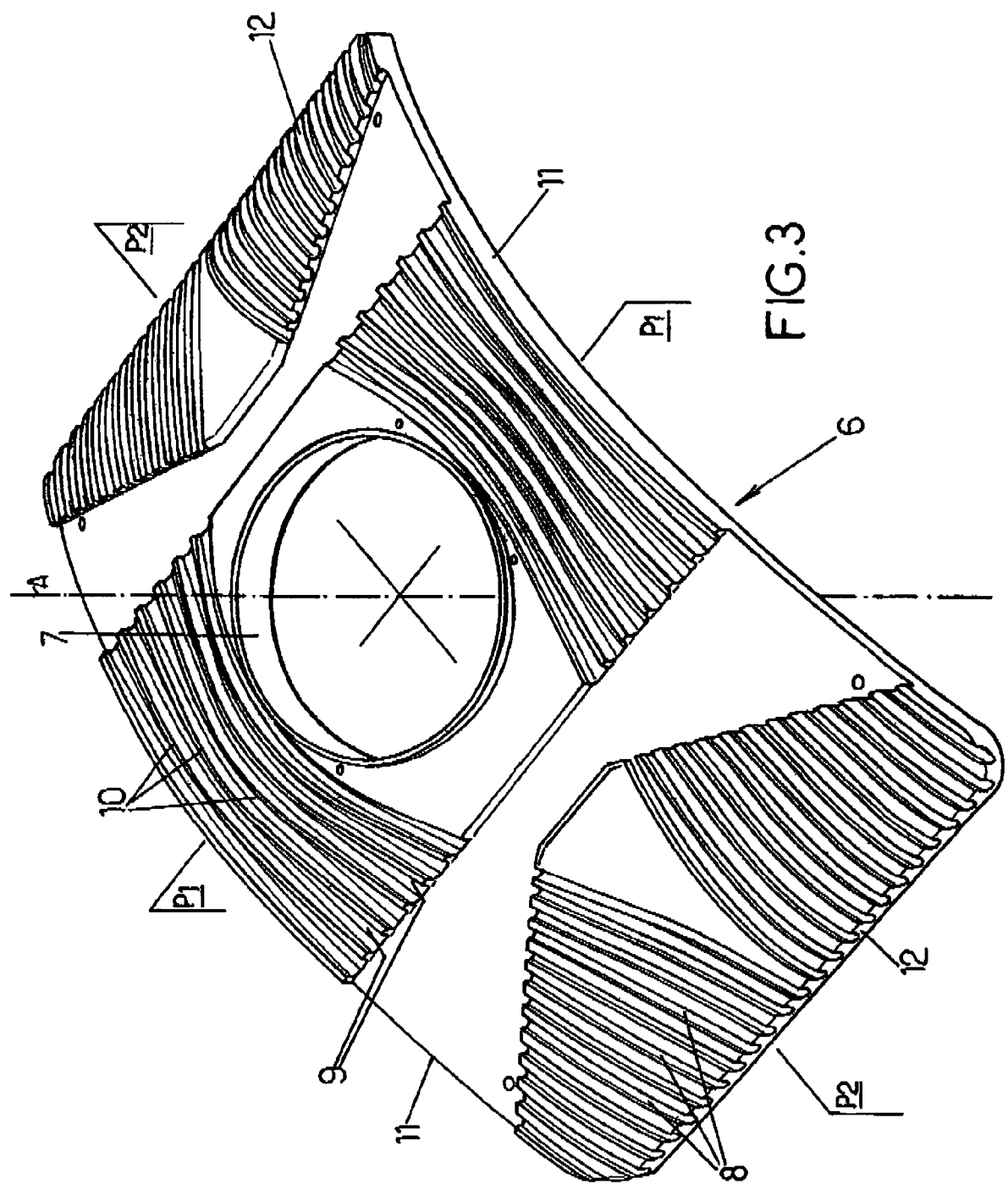
FIG. 3 is a perspective view of a prefabricated plate according to the invention.

In order nevertheless to ensure a reinforcement of the pipeline in this zone 4, according to a first embodiment of the invention a prefabricated deflection plate 6, which can be seen in FIG. 2 and is illustrated in more detail in FIGS. 3 to 5, is arranged around the projection 1 before the strands 3 are put in place.

The deflection plate 6 is produced, for example, from cast iron. It has a general shape in the form of a sector of a cylinder, with a radius approximately equal to that of the pipeline 2 over an angular sector of the order of 60° to 90°. It has passing through it at its centre a circular orifice 7 having a diameter greater than that of the projection 1, so that the plate 6 can cap the upper side of the pipeline 2 in the zone 4 where the projection 1 is located. The plate 6 has two planes of symmetry P1, P2 perpendicular to one another and intersecting along the central axis A of the orifice 7: the longitudinal mid-plane P1 is vertical and parallel to the pipeline 2, whilst the transverse mid-plane P2 is vertical and perpendicular to the pipeline 2. The distance between the two transverse edges 11 of the plate 6, which are parallel to the plane P2, may be of the order of double the diameter of the orifice 7.

It will be noted that such a deflection plate 6 could be formed by a plurality of smaller plates being arranged around the projection 1.

The deflection plate 6 is provided with channels for guiding the strands 3. These channels are in the form of grooves 8, 10 formed on the convex upper face of the plate 6, said upper face being oriented opposite the pipeline 2.

As shown in FIG. 3, the grooves 8 have a U-shaped cross-section along the two lateral edges 12 of the plate 6 which are located on either side of the plane P1. The base of this U shape is circular, with a radius R slightly greater than that of a strand protected by its double sheath, so that each groove 8 receives an individual strand in this region. The gap between the grooves 8 along the lateral edges 12 may be uniform and correspond to a predefined prestressing density in the zone 4.

Towards the longitudinal mid-plane P1, the grooves 8 curve progressively, at the same time moving away from the transverse mid-plane P2, so as to start the paths allowing the strands to bypass the projection 1 and the orifice 7. Thus, the grooves 8 approach one another on each side of the plane P2.

Approximately half way between the lateral edge 12 and the mid-plane P1, these grooves merge in pairs, the cross section of the merged grooves 9 having the shape illustrated in FIG. 4. Each merged groove 9 offers two bearing surfaces 14, 15 of circular cross-section for respectively receiving two sheathed strands. It is appropriate to prevent these two sheathed strands from bearing on one another, since they would otherwise damage their sheaths during tensioning. Consequently, the two bearing surfaces 14, 15 part from one another progressively perpendicularly to the plate, the bearing surface 15 nearest the orifice 7 being offset above that 14 which is nearest the transverse edge 11 of the plate. As a result of this, the two strands received in the merged groove 9 are positioned in two different layers, whereas all the strands 3 were in the same layer on the lower pipeline side not covered by the plate 6.

The spacing between these two layers grows in the central part of the deflection plate 6 in line with the plane P1. This is necessitated by the overall size of the strands, which continue to approach one another in the longitudinal direction. In this central part, the merged grooves 10 have the shape illustrated in FIG. 5, where it can be seen that the cylindrical bearing surfaces 14, 15 have between them a height difference which may exceed their diameter.

The two separate layers of strands 3 can be seen in profile in the diagrammatic view of FIG. 8.

The concave lower face of the prefabricated deflection plate 10 will generally be of uniform shape. However, that wall of the pipeline 2 on which the plate bears will often be irregular, particularly due to the defects it may have and of the bedding operations which may be carried out before laying the plate. In order to ensure a bearing contact which effectively distributes the compressive forces exerted by the prestressing strands, the prefabricated plate is preferably laid onto the pipeline with a gap filled by a positioning mortar poured in situ. In order to prevent the strands 3 from having angular points in the region of the lateral edges 12 of the plate, the ends of the channels 8 are given, in the vicinity of these edges 12 a beveled shape on which the strands 3 are guided at the entrance to the prefabricated plate 6.

Instead of the deflection plate 6 being prefabricated from cast iron, it is possible to produce it from poured concrete. In view of the small spacing between the channels serving for guiding the strands, it will generally not be possible for reinforcements to be arranged in the mass of this concrete. It is therefore necessary, in this case, to use an ultra high performance concrete (UHPC) having a compressive strength greater than 40 MPa, and preferably greater than 120 MPa. This may be, in particular, an ultra performing fiber concrete (UPFC).

When it is prefabricated from poured concrete, the deflection plate 6 may, if appropriate, have its guide channels completely surrounded by concrete, the two which form the outer sheaths of the strands being placed in the mould in order to delimit these channels while the UHPC is being poured.

Figure 7:
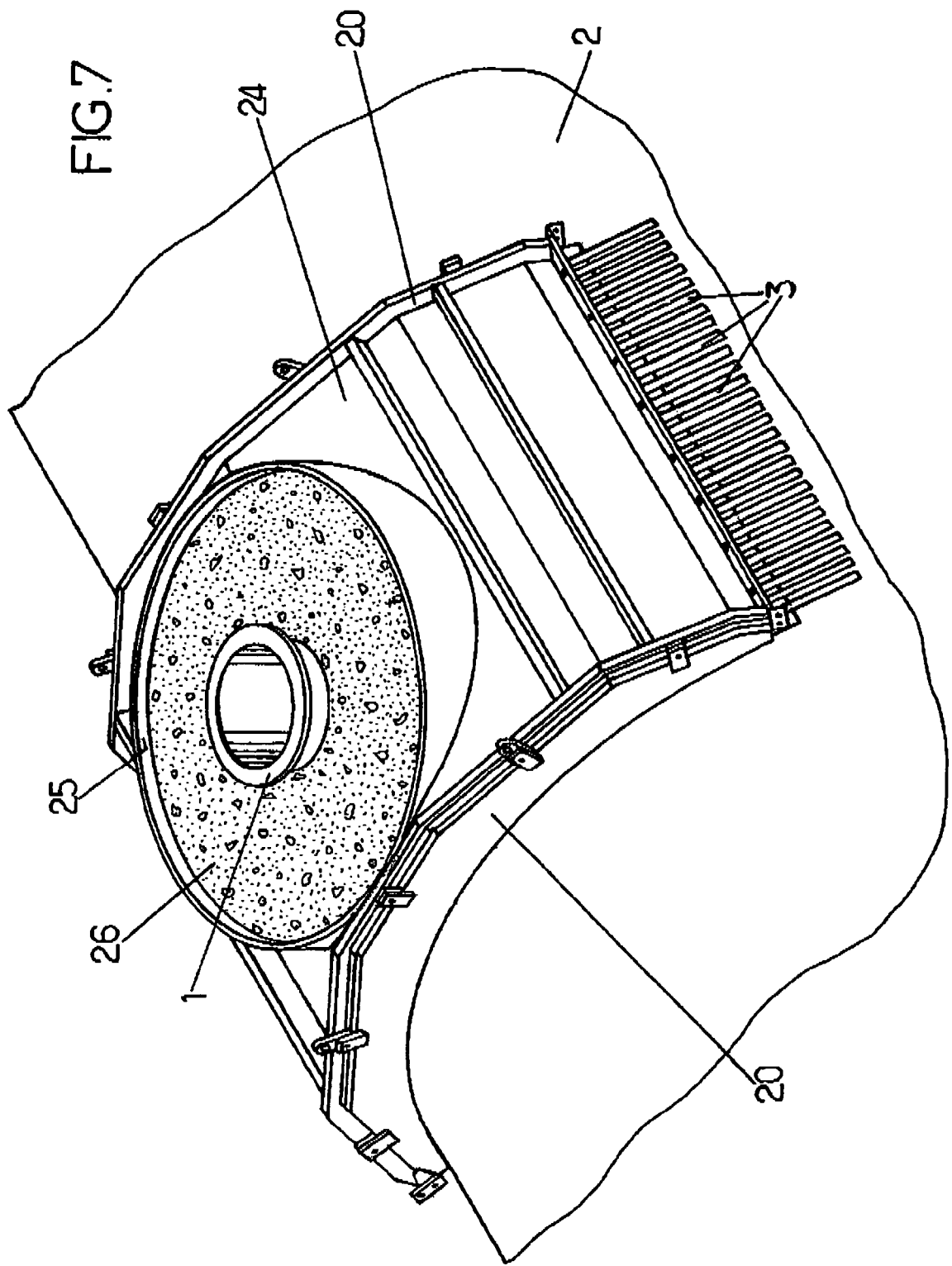
FIG. 7 is a perspective view, similar to that of FIG. 6, after the pouring of the concrete into the formwork.

FIGS. 6 to 8 illustrate another embodiment of the method according to the invention, in which the deflection of the prestressing strands is ensured by means of a concrete mass poured in situ.

FIG. 6 shows the pipeline 2 after the freeing, under the same conditions as before, of the anchoring plate 16 provided initially around the projection 1. The mass of poured concrete is received above this plate in a formwork laid on the upper side of the pipeline.

In the first place, the transverse faces 20 of this formwork are laid perpendicularly to the axis of the pipeline 2, the lower edge of each of these form work faces being applied against the upper part of the pipeline 2 or of the anchoring plate 16. Longitudinal members 21, 22 are positioned between the transverse faces 20 of the formwork. Each longitudinal member 21, 22 carries two levels of comb shaped separators in order to define the individual paths of the strands in the two layers. These paths are essentially the same as in the embodiment described above. The middle longitudinal member 22, extending parallel to the direction of the pipeline in line with the projection 1, has its separators positioned so as to define a distribution of the strands which is similar to that defined by the central part 10 of the grooves in the embodiment illustrated in FIG. 5 (a different distribution of the strands would also be possible). In the example under consideration, there are two additional longitudinal members 21, extending on either side of the projection 1, with their separators positioned so as to define a distribution of the strands which is similar to that defined by the part 9 of the grooves, which is illustrated in FIG. 4. Other pairs of longitudinal members may be provided in order to guide the paths of the strands around the projection 1 more progressively. Some of these longitudinal members, in the vicinity of the lateral edges of the formwork, may carry only one level of separators.

The strands 3 are then put in place so as to bypass the projection 1, with their outer sheaths being placed in receptacles delimited by the separators of the longitudinal members 21, 22 and held in place, but without the tension required for the prestress being applied to them.

Once all the strands have been put in place (only half are illustrated in FIG. 6), the upper face 24 of the formwork, which allows the sheaths of the strands to emerge along the two lateral edges of the formwork, is put in place. The central portion of this upper formwork face 24 has an orifice 25 which extends widely around the projection 1 (FIG. 7). The concrete 26 is poured into this orifice so that it fills the internal volume of the formwork.

The above-mentioned UHPC or UPFC concrete compositions are advantageous because of their ability to correctly fill the mold without requiring vibration, which is of importance in the application to repairing damaged pressurized pipes.

After the setting of the poured concrete 26, the formwork 20, 24 is dismantled, the longitudinal members 21, 22 remaining embedded in the mass of hardened concrete. The reinforcements can then be tensioned and anchored by means of anchoring devices 5 located outside the zone where the strands 3 are raised by the anchoring plate 6 and the concrete mass 26.

What is claimed is:

1. A method of reinforcing a cylindrical pipeline wherein prestressing reinforcements are placed and tensioned around the pipeline, wherein, in a zone where the pipeline has a radial projection on a first side, the prestressing reinforcements are deflected to bypass the radial projection, and wherein reinforcements located in a common layer on a second side of the pipeline opposite the first side are distributed in a plurality of layers on the first side, wherein the deflection of the reinforcements around the radial projection is obtained by means of at least one prefabricated plate having an orifice providing a passage for the radial projection and channels for guiding the reinforcements.

2. The method as claimed in claim 1, wherein the channels for guiding the reinforcements are in the form of grooves open onto an upper face of the prefabricated plate.

3. The method as claimed in claim 2, wherein the grooves are arranged for receiving reinforcements individually along two edges of the prefabricated plate located on either side of a mid-plane containing a longitudinal direction of the pipeline and a direction of the radial projection, and wherein the grooves merge at least in pairs in a cross-section along said mid-plane, so as to provide the plurality of reinforcements received in a merged groove with a plurality of bearing surfaces located in different layers perpendicularly to the plate.

4. The method as claimed in claim 1, further comprising guiding the reinforcements at the entrance to the prefabricated plate so as to prevent the reinforcements from having angular points at the edge of the plate.

5. The method as claimed in claim 1, wherein the prefabricated plate is laid onto the pipeline with a gap filled by a positioning mortar.

6. The method as claimed in claim 1, wherein the prefabricated plate is made from cast iron.

7. The method as claimed in claim 1, wherein the prefabricated plate is made from poured concrete.

8. A method of reinforcing a cylindrical pipeline, wherein prestressing reinforcements are placed and tensioned around the pipeline, wherein in a zone where the pipeline has a radial projection on a first side, the prestressing reinforcements are deflected to bypass the radial projection, and wherein reinforcements located in a common layer on a second side of the pipeline opposite the first side are distributed in a plurality of layers on the first side, the method comprising the following steps prior to tensioning the prestressing reinforcements:

placing a formwork in said zone of the pipeline on the first side;

positioning spacing means within said formwork to define paths in the plurality of layers for the reinforcements; and pouring concrete into the formwork, the reinforcements being tensioned after the poured concrete has set.

9. The method as claimed in claim 8, further comprising the step of arranging individual tubes in the formwork, each tube receiving a respective prestressing reinforcement.

10. Method of reinforcing a cylindrical pipeline, wherein prestressing members are installed and tensioned around the pipeline, the method comprising the steps of:

selecting a section of the pipeline to receive a radial projection on a first side of the pipeline; and deflecting the prestressing members by means of at least one prefabricated plate having an orifice providing a passage for the radial projection and channels for guiding the prestressing members, to guide said members off a position of the radial projection so that the prestressing members located in a common layer on a second side of the pipe opposed to the first side are distributed into a plurality of layers on the first side.

11. The method as claimed in claim 10, wherein the channels for guiding the prestressing members are in the form of grooves open onto an upper face of the prefabricated plate.

12. The method as claimed in claim 11, wherein the grooves are arranged for receiving prestressing members individually along two edges of the prefabricated plate located on either side of a mid-plane containing a longitudinal direction of the pipeline and a direction of the radial projection, and wherein the grooves merge at least in pairs in a cross-section along said midplane, so as to provide the plurality of prestressing members received in a merged groove with a plurality of bearing surfaces located in different layers perpendicularly to the plate.

13. The method as claimed in claim 10, further comprising guiding the prestressing members at the entrance to the prefabricated plate so as to prevent the prestressing members from having angular points at the edge of the plate.

14. The method as claimed in claim 10, wherein the prefabricated plate is laid onto the pipeline with a gap filled by a positioning mortar.

15. The method as claimed in claim 10, wherein the prefabricated plate is made from cast iron.

16. The method as claimed in claim 10, wherein the prefabricated plate is made from poured concrete.

17. The method as claimed in claim 16, wherein the poured concrete has a compressive strength greater than 120 MPa.

18. A method of reinforcing a cylindrical pipeline, wherein prestressing members are installed and tensioned around the pipeline, the method comprising the steps of:

selecting a section of the pipeline to receive a radial projection on a first side of the pipeline; and deflecting the prestressing members to guide said members off a position of the radial projection so that the prestressing members located in a common layer on a second side of the pipe opposed to the first side are distributed into a plurality of layers on the first side, the method further comprising the following steps prior to tensioning the prestressing members:

placing a formwork in said section of the pipeline on the first side;

positioning spacing means within said formwork to define paths in the plurality of layers for the prestressing members; and pouring concrete into the formwork, the prestressing members being tensioned after the poured concrete has set.

19. The method as claimed in claim 18, further comprising the step of arranging individual tubes in the formwork, each tube receiving a respective prestressing member.

20. Prefabricated plate having an orifice to be placed around a radial projection on a first side of a cylindrical pipeline, and channels for guiding prestressing members for said pipeline, the channels having a shape adapted to deflect the prestressing members in order to guide said members off a position of the radial projection so that the prestressing members located in a common layer on a second side of the pipe opposed to the first side are distributed into a plurality of layers on the first side.

21. The prefabricated plate as claimed in claim 20, wherein the channels for guiding the prestressing members are in the form of grooves open onto an upper face of the prefabricated plate.

22. The prefabricated plate as claimed in claim 21, wherein the grooves are arranged for receiving prestressing members individually along two edges of the prefabricated plate located on either side of a mid-plane containing a longitudinal direction of the pipeline and a direction of the radial projection, and wherein the grooves merge at least in pairs in a crosssection along said mid-plane, so as to provide the plurality of prestressing members received in a merged groove with a plurality of bearing surfaces located in different layers perpendicularly to the plate.

23. The prefabricated plate as claimed in claim 20, made from cast iron.

24. The prefabricated plate as claimed in claim 20, made from poured concrete.

25. The prefabricated plate as claimed in claim 24, wherein the poured concrete has a compressive strength greater than 120 MPa.

* * * * *